United States Patent
Yamasaki et al.

(10) Patent No.: US 9,324,359 B2
(45) Date of Patent: Apr. 26, 2016

(54) SYSTEM AND SERVER FOR EFFICIENT DATA RECORDING ON AND REPRODUCTION FROM STORAGE MEDIA HAVING MULTIPLE SURFACES

(71) Applicants: Hitachi-LG Data Storage, Inc., Tokyo (JP); Hitachi Consumer Electronics Co., Ltd., Tokyo (JP)

(72) Inventors: Koji Yamasaki, Yokohama (JP); Shinichi Shimoda, Yokohama (JP); Shimpei Usui, Yokohama (JP); Toshihiro Kato, Tokyo (JP)

(73) Assignees: HITACHI—LG DATA STORAGE, INC., Tokyo (JP); HITACHI CONSUMER ELECTRONICS CO., LTD., Tokyo (JP)

( * ) Notice: Subject to any disclaimer, the term of this patent is extended or adjusted under 35 U.S.C. 154(b) by 232 days.

(21) Appl. No.: 13/782,059

(22) Filed: Mar. 1, 2013

(65) Prior Publication Data

US 2013/0258826 A1  Oct. 3, 2013

(30) Foreign Application Priority Data

Mar. 30, 2012  (JP) ................. 2012-078873

(51) Int. Cl.
- *G11B 17/04* (2006.01)
- *G11B 17/22* (2006.01)
- *G11B 27/00* (2006.01)
- *G06F 11/14* (2006.01)

(52) U.S. Cl.
CPC .............. *G11B 17/04* (2013.01); *G11B 17/228* (2013.01); *G11B 27/002* (2013.01); *G06F 11/1456* (2013.01); *G11B 2220/2575* (2013.01); *G11B 2220/41* (2013.01)

(58) Field of Classification Search
CPC ....................................................... G11B 17/04
USPC ....................................................... 369/30.38
See application file for complete search history.

(56) References Cited

U.S. PATENT DOCUMENTS 5,870,360 A * 2/1999 Ito et al. ................... 369/30.85
6,125,427 A    9/2000 Oeda et al.
(Continued)

FOREIGN PATENT DOCUMENTS

| JP | 6-332768 | 12/1994 |
| JP | 8-263335 | 10/1996 |
| JP | 2005-025861 A | 1/2005 |

OTHER PUBLICATIONS

U.S. Appl. No. 13/758,064, filed Feb. 4, 2013
(Continued)

*Primary Examiner* — Kevin Verbrugge
*Assistant Examiner* — Zubair Ahmed
(74) *Attorney, Agent, or Firm* — Baker Botts L.L.P.

(57) ABSTRACT

Data recording and reproduction systems, apparatus, and methods provide efficient recording of and reproduction from storage media having multiple surfaces. In particular, a grouping processing unit groups data based on several factors. The grouped data can then be efficiently stored on storage media having multiple sides to increase the efficiency of storage and retrieval of such data. For example, data belonging to the same group is not stored on two surfaces of the same storage media to avoid having to remove and reverse the direction of the storage media in order to store data on or retrieve data from the other side of the storage media.

8 Claims, 9 Drawing Sheets

(56) References Cited

U.S. PATENT DOCUMENTS

| | | |
|---|---|---|
| 6,600,967 B2 | 7/2003 | Milligan et al. |
| 6,937,540 B1 | 8/2005 | Kikuchi et al. |
| 7,472,223 B1 | 12/2008 | Ofer |
| 8,032,702 B2 | 10/2011 | Grimes et al. |
| 8,289,641 B1 | 10/2012 | Emami |
| 2005/0094181 A1* | 5/2005 | Koyano ........................ 358/1.13 |

OTHER PUBLICATIONS

U.S. Appl. No. 13/758,064, Office Action mailed Dec. 4, 2013.
U.S. Appl. No. 13/758,064, Response filed Apr. 10, 2014.
U.S. Appl. No. 13/758,064, Office Action mailed Jul. 29, 2014.
U.S. Appl. No. 13/758,064, Response filed Dec. 29, 2014.
U.S. Appl. No. 13/758,064, Office Action mailed Jan. 14, 2015.

* cited by examiner

FIG. 6

| RECORDING MEDIUM ID | RECORDING SURFACE | GROUP ID OF RECORDED DATA | FREE AREA |
|---|---|---|---|
| disk1 | FRONT | A,B | 0GB |
|  | REAR | UNRECORDED | 50GB |
| disk2 | FRONT | B,C | 0GB |
|  | REAR | UNRECORDED | 50GB |
| disk3 | FRONT | C | 0GB |
|  | REAR | A | 10GB |
| ⋮ | ⋮ | ⋮ | ⋮ |
| ⋮ | ⋮ | ⋮ | ⋮ |

FIG. 7

| DATA ID | GROUP ID | DATA SIZE | RECORDING MEDIUM ID | RECORDING SURFACE |
|---|---|---|---|---|
| data1 | A | 100KB | disk1 | FRONT |
| data2 | B | 256MB | disk1 | FRONT |
| data3 | C | 1GB | disk3 | FRONT |
| data4 | A | 100KB | disk3 | REAR |
| data5 | A | 256MB | HDD | – |
| data6 | B | 1GB | HDD | – |
| ⋮ | ⋮ | ⋮ | ⋮ | ⋮ |
| ⋮ | ⋮ | ⋮ | ⋮ | ⋮ |

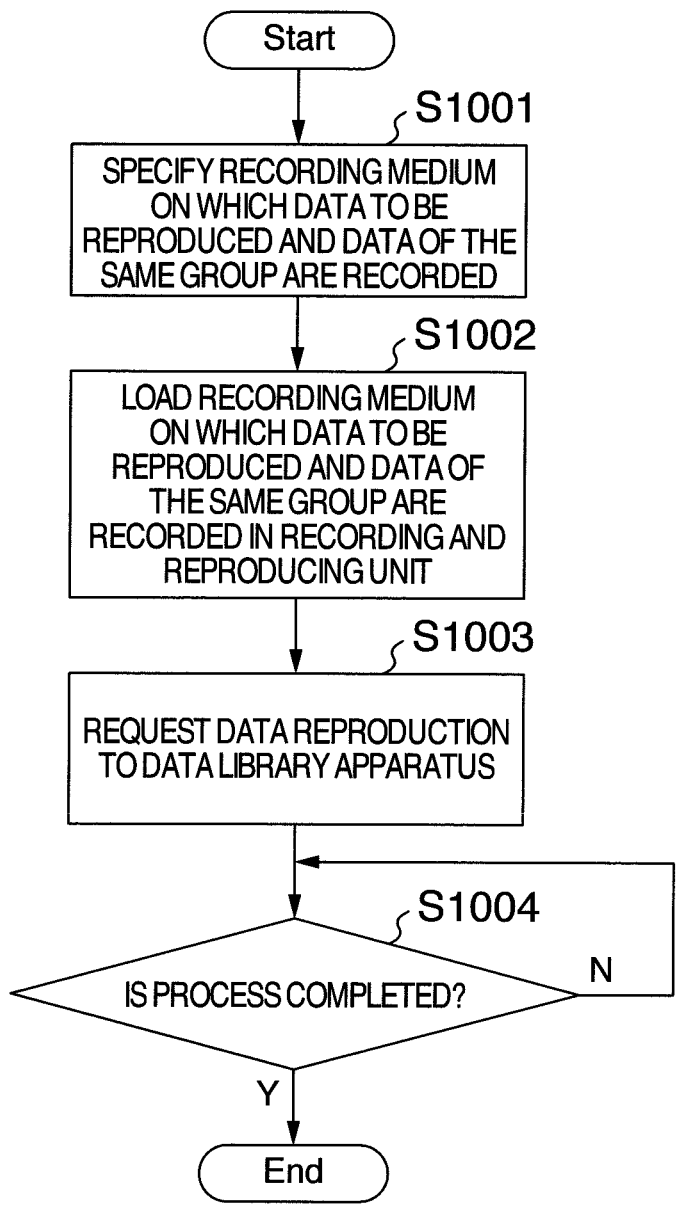

SYSTEM AND SERVER FOR EFFICIENT DATA RECORDING ON AND REPRODUCTION FROM STORAGE MEDIA HAVING MULTIPLE SURFACES

INCORPORATION BY REFERENCE

The present application claims priority from Japanese application JP2012-078873 filed on Mar. 30, 2012, the content of which is hereby incorporated by reference into this application.

BACKGROUND OF THE INVENTION

The present invention relates to a recording and reproducing system.

As a background art of this technical field, JP-A-08-263335 (Patent Literature 1) is disclosed. In Patent Literature 1, at the time of performing a data rearrangement process of a data recording device including a plurality of recording media, there is disclosed that "a plurality of files which are correlative with each other are extracted as one group, each block data of the extracted files is read out from an optical disk 11, and each block data corresponding to this read-out file is then successively written into continuous or nearby blocks of the optical disk 11".

Further, in JP-A-06-332768 (Patent Literature 2), there is disclosed that "in a data library system having a registration means 21 of writing and registering data transmitted from a data generator A in the media within a data library device 1 and a reference update means 22 of reading the registered data and transmitting it to a data display device B, a medium assignment control means 23 is provided, the partial items of the items in data to be registered are preliminarily selected as dispersion keys, the registered data is divided into groups by these dispersion keys, media are assigned to the groups, the correspondence of the number of medium and the dispersion key is controlled by a medium control table 20, and the registration means 21 writes data in the assigned media".

SUMMARY OF THE INVENTION

In Patent Literature 1, there is disclosed a mechanism for bringing a plurality of related data sets into one recording medium so as to efficiently reproduce them. On the other hand, in Patent Literature 2, there is disclosed that when recorded data is divided into groups to select a recording medium for each group, a mechanism for efficiently managing the recording media is provided. However, in Patent Literatures 1 and 2, a recording medium having recording surfaces at both of front and rear surfaces is not considered.

In view of the foregoing, it is an object of the present invention to provide a recording and reproducing system capable of efficiently performing a reproducing process of related data also in a recording medium having recording surfaces at both sides of front and rear surfaces in the recording and reproducing system including a plurality of recording media.

To solve the above problem, for example, a configuration described in claims is adopted.

According to the present invention, in a recording and reproducing system including a plurality of recording media, a reproducing process of data is efficiently performed also in a recording medium having recording surfaces at both of front and rear surfaces.

Other objects, configurations and advantages of the invention will become apparent from the following description of the embodiments of the invention taken in conjunction with the accompanying drawings.

BRIEF DESCRIPTION OF THE DRAWINGS

FIG. 6 illustrates one example of a recording medium management table;

FIG. 7 illustrates one example of a data management table;

FIG. 10 is a flowchart illustrating a reproduction motion of a recording medium in a recording and reproducing system.

DESCRIPTION OF THE EMBODIMENTS

Hereinafter, preferred embodiments of the present invention will be described with reference to the accompanying drawings of the embodiments.

First Embodiment

The first embodiment is an embodiment in the case of treating a double-sided readable and writable recording medium in a data library apparatus having a function of transporting a recording medium from a recording medium storage unit to a recording and reproducing unit for loading through a recording medium transportation unit.

The data library apparatus is used in a backup for the purpose of protecting data recorded on a server or a disk array device, or an archive for the purpose of safely storing the data over a long period of time.

Figure 1:
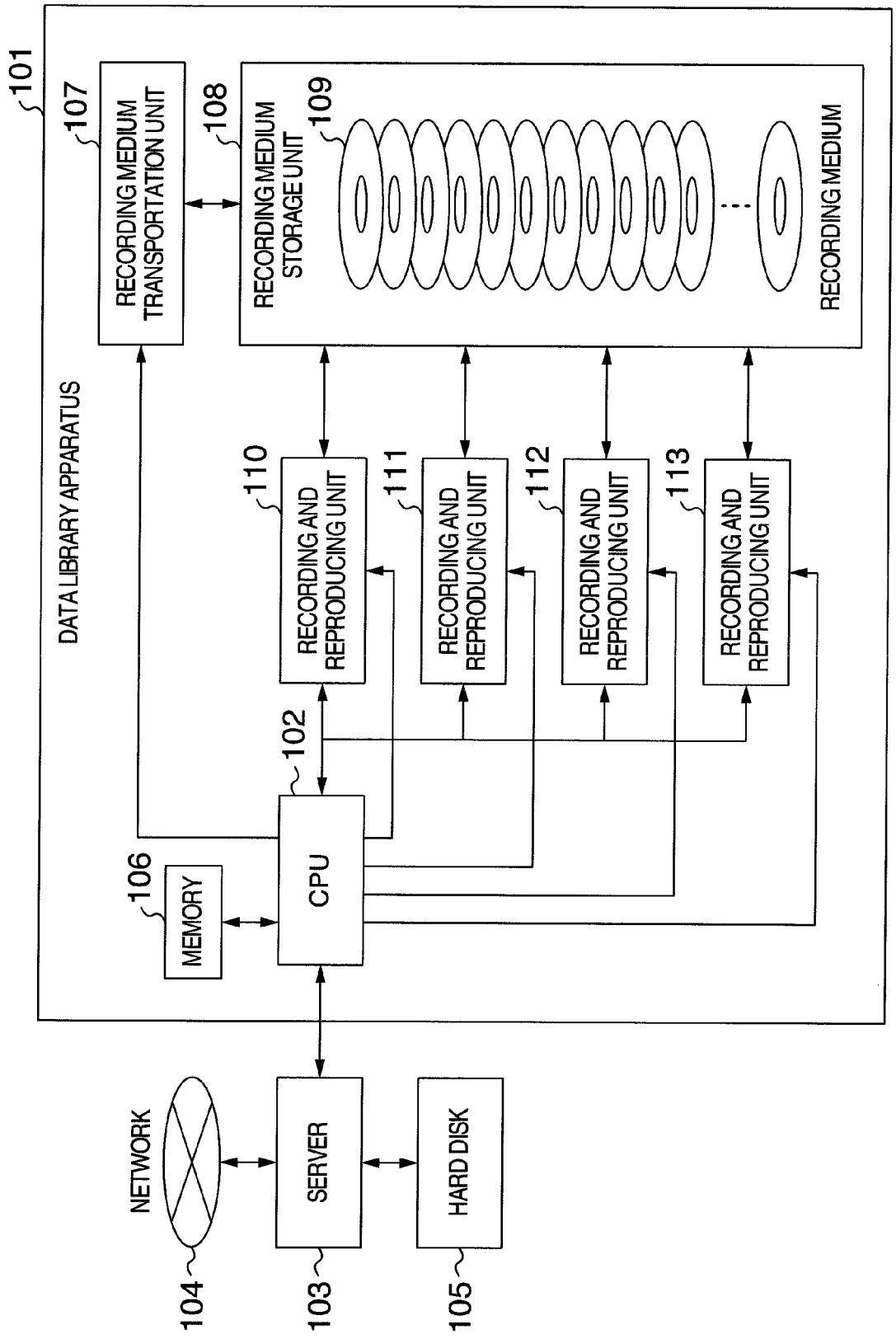
FIG. 1 is a block diagram illustrating a configuration of a data library apparatus.

FIG. 1 is a block diagram illustrating a configuration of the data library apparatus.

At the time of recording, the data library apparatus 101 receives data from a network 104, stores it in a hard disk 105 via a server 103, and records the stored data on a recording medium 109. At the time of reproduction, the data library apparatus 101 reproduces data from the hard disk 105 or recording medium 109 and transmits it to the network 104 via the server 103. The server 103 controls the data library apparatus 101 through communication with a CPU (Central Processing Unit) 102 built in the data library apparatus 101, At the same time, the server 103 controls the hard disk 105 and performs data management such as recording and reproduction of data or transmission and reception of data via the network 104.

The hard disk 105 stores data transmitted from the network 104 while controlled by the server 103. In FIG. 1, the hard disk 105 is illustrated on the outer side of the server 103; however, may be included in the server 103.

A reference numeral 109 denotes an optical disk as represented, for example, by a DVD-RAM (Digital Versatile Disk Random Access Memory). In the recording medium 109, data is further recorded and reproduced on and from both of front and rear surfaces. The recording medium 109 may further be a recording medium such as a magnetic optical disk and a hologram.

A plurality of the recording media 109 are stored in a recording medium storage unit 108. In FIG. 1, the recording medium storage unit 108 is illustrated singly, and further may be built in the data library apparatus 101 in plurality. The recording medium storage unit 108 may be used as usage, for example, one is an unrecorded recording medium storage device, and another is a recorded recording medium storage device. Needless to say, the inside of the recording medium storage unit 108 may be divided into an unrecorded recording medium storage area and a recorded recording medium storage area.

When data is recorded, the recording medium 109 is taken out from the recording medium storage unit 108 by the recording medium transportation unit 107 and is loaded in any of the recording and reproducing units 110, 111, 112, and 113. When data recording is finished, the recording medium 109 is returned to the recording medium storage unit 108 by the recording medium transportation unit 107. On the other hand, when data is reproduced, the recording medium 109 is taken out from the recording medium storage unit 108 by the recording medium transportation unit 107 and is loaded in any of the recording and reproducing units 110, 111, 112, and 113. Through the process, the data is reproduced. When data reproduction is finished, the recording medium 109 is returned to the recording medium storage unit 108 by the recording medium transportation unit 107. The recording and reproducing units 110, 111, 112, and 113 record or reproduce data on or from on the recording medium 109 while controlled by the CPU 102 of the data library apparatus 101.

While controlled by the CPU 102 of the data library apparatus 101, the recording medium transportation unit 107 takes out the recording medium 109 from the recording medium storage unit 108 and transports it, thus loading it in any of the recording and reproducing units 110, 111, 112, and 113. On this occasion, under the control of the CPU 102 of the data library apparatus 101, when data is recorded or reproduced on or from the front surface, the recording medium transportation unit 107 loads the recording medium 109 in the recording and reproducing unit so as to record or reproduce data on or from the front surface. On the other hand, when data is recorded or reproduced on or from the rear surface, the recording medium transportation unit 107 loads the recording medium 109 in the recording and reproducing unit so as to record or reproduce data on or from the rear surface. Alternatively, the recording medium transportation unit 107 receives the recording medium 109 from any of the recording and reproducing units 110, 111, 112, and 113, and transports it, thus storing it in the recording medium storage unit 108. Between the recording and reproducing units, the recording medium may be further transported, for example, from the recording and reproducing unit 110 to the recording and reproducing unit 111. When the data library apparatus 101 has a plurality of the recording medium storage units built-in, the recording medium transportation unit 107 may further transport the recording medium from one built-in recording medium storage unit to another built-in recording medium storage unit.

Based on a request from the server 103, the CPU 102 of the data library apparatus 101 controls the recording medium transportation unit 107 to select a desired recording medium from among a plurality of the recording media 109 stored in the recording medium storage unit 108 and transfer it to any of the recording and reproducing units 110, 111, 112, and 113. The CPU 102 further controls the recording medium transportation unit 107 to receive the recording medium 109 from any of the recording and reproducing units 110, 111, 112, and 113 and store it in a predetermined position of the recording medium storage unit 108. A reference numeral 106 denotes a memory. On the memory 106, a program or a variety of setting information for controlling the CPU 102 of the data library apparatus 101 is recorded.

Figure 2:
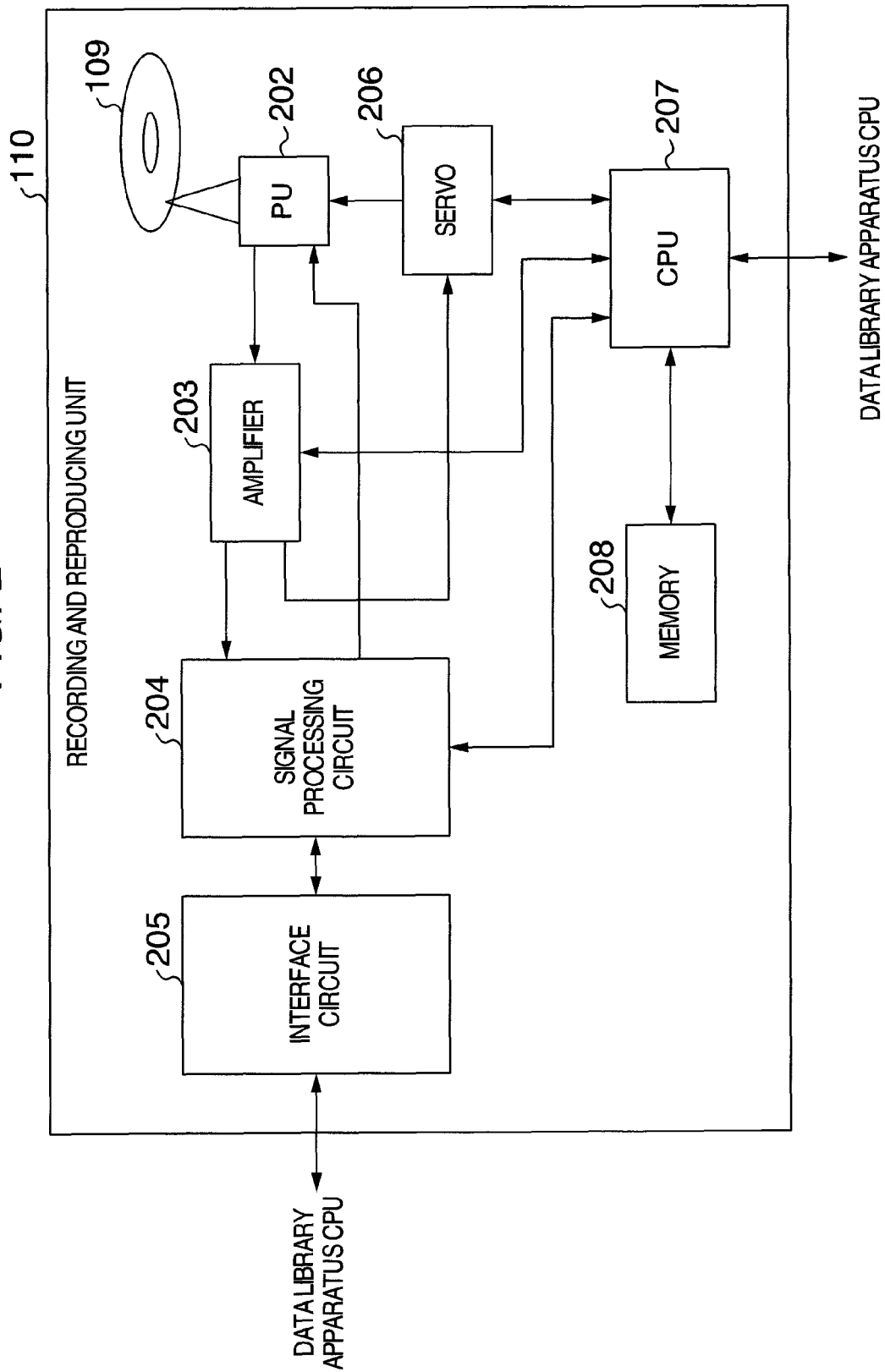
FIG. 2 is a block diagram illustrating a configuration of a recording and reproducing unit.

FIG. 2 is a block diagram illustrating a configuration of the recording and reproducing unit. The recording and reproducing unit 110 records data produced from the CPU 102 of the data library apparatus 101 on the recording medium 109. The recording and reproducing unit 110 further supplies the data reproduced from the recording medium 109 to the CPU 102 of the data library apparatus 101.

A reference numeral 207 denotes a CPU of the recording and reproducing unit 110. The CPU 207 controls recording and reproducing processes of the recording and reproducing unit 110. In place of the CPU 207, an arbitrary circuit capable of the same control may be used.

A reference numeral 202 denotes an optical pickup. The optical pickup 202 reads out a signal from the recording medium 109 and supplies it to an amplifier circuit 203. The optical pickup 202 further records on the recording medium 109 a modulating signal produced from a signal processing circuit 204. The amplifier circuit 203 amplifies a reproduced signal read out from the recording medium 109 via the optical pickup 202 and supplies it to the signal processing circuit 204. The amplifier circuit 203 further generates a servo signal and supplies it to a servo circuit 206.

The signal processing circuit 204 demodulates an input signal and supplies to an interface circuit 205 data in which error correction is performed. The signal processing circuit 204 further adds an error-correcting code to the data produced from the interface circuit 205 and modulates the added data, thus supplying the modulated data to the optical pickup 202. The interface circuit 205 performs a data transfer process in accordance with a transfer system such as SATA (Serial Advanced Technology Attachment) and so on. At the time of data transfer, the interface circuit 205 supplies the data produced from the signal processing circuit 204 to the CPU 102 of the data library apparatus 101 being a host. The interface circuit 205 further supplies to the signal processing circuit 204 the data produced from the CPU 102 of the data library apparatus 101 being a host.

A reference numeral 208 denotes a memory, and the memory 208 stores a program or a variety of setting information for controlling the recording and reproducing units and medium information obtained from the recording medium. An example where the memory 208 is connected to the CPU 207 of the recording and reproducing unit is illustrated, and further the memory 208 may be connected to any unit in the inside and outside of the recording and reproducing unit. If information can be kept, a memory need not be used and, for example, a hard disk may be used. The servo circuit 206 controls the optical pickup 202 by using a servo signal generated by the amplifier circuit 203.

Through the recording and reproducing unit 110 having the above-described configuration, data is recorded on the recording medium 109 in accordance with an instruction from the CPU 102 of the data library apparatus 101. Further, data is reproduced from the recording medium 109 and transferred to the CPU 102 of the data library apparatus 101. The recording and reproducing unit 110 is here described, and the recording and reproducing units 111, 112 and 113 also have the same configuration.

Figure 3:
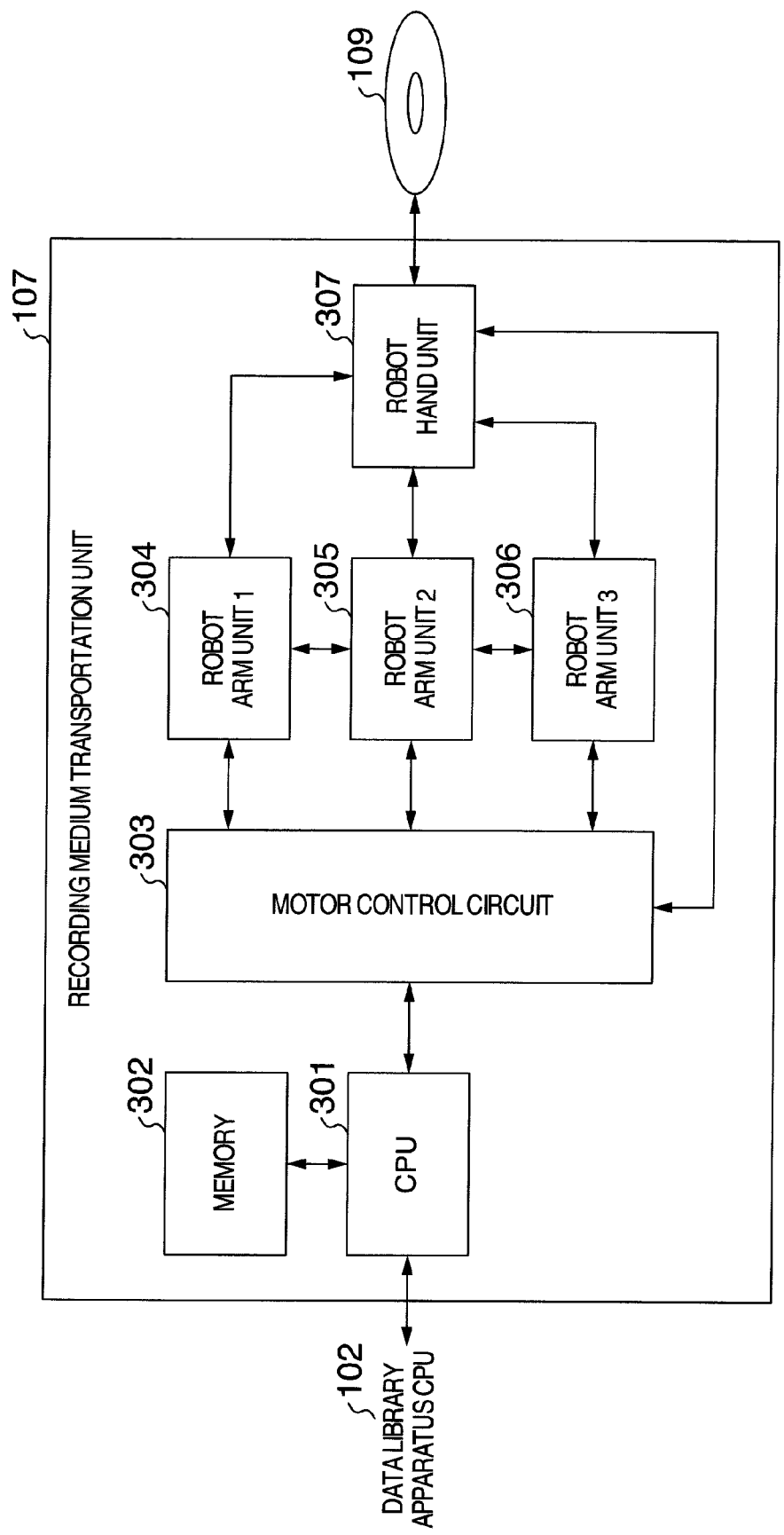
FIG. 3 is a block diagram illustrating a recording medium transportation unit.
Figure 4:
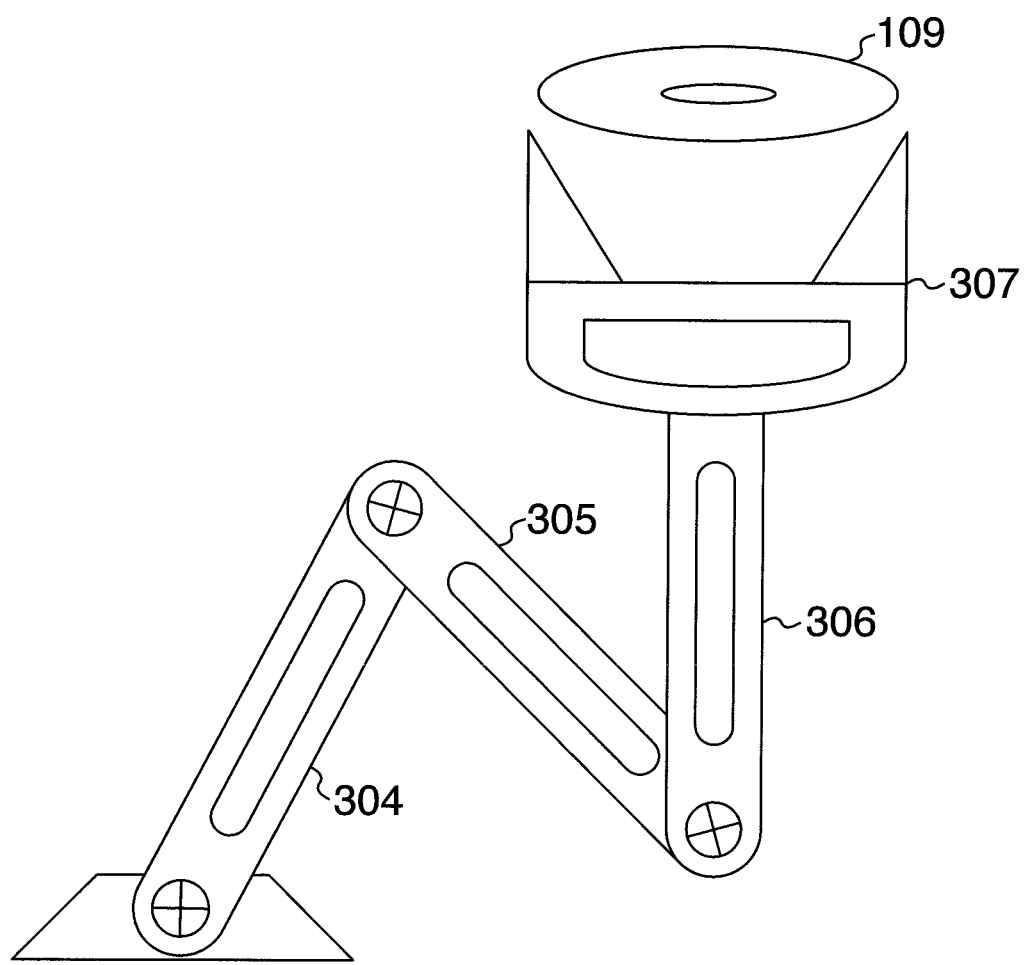
FIG. 4 is an external view illustrating a recording medium transportation unit.

FIG. 3 is an example of a block diagram illustrating the recording medium transportation unit, and FIG. 4 is an example of an external view illustrating the recording medium transportation unit.

Based on an instruction from the CPU 102 of the data library apparatus 101, the recording medium transportation unit 107 takes out the recording medium 109 from the recording medium storage unit 108 and loads it in any of the recording and reproducing units 110, 111, 112, and 113. The recording medium transportation unit 107 further takes out the recording medium 109 from the recording and reproducing unit and stores it in the recording medium storage unit 108.

A reference numeral 301 denotes a CPU, and the CPU 301 controls the recording medium transportation unit 107. A reference numeral 302 denotes a memory, and the memory 302 stores a program or a variety of setting information for controlling the recording medium transportation unit 107. An example where the memory 302 is connected to the CPU 301 of the recording medium transportation unit 107 is illustrated, and further the memory 302 may be connected to any unit in the inside and outside of the recording medium transportation unit 107. If information can be kept, a memory need not be used and, for example, a hard disk may be used.

A reference numeral 303 denotes a motor control circuit, and the motor control circuit 303 drives robot arm units 304, 305, and 306 based on an instruction from the CPU 301. The motor control circuit 303 further drives a robot hand unit 307.

The robot arm units 304, 305, and 306 adjust a position of the robot hand unit 307 through a rotary motion and a translatory motion such as forward and reverse travels.

The robot hand unit 307 has a shape capable of holding the recording medium 109 without damaging it, and delivers and receives the recording medium to and from the recording medium storage unit 108 and the recording and reproducing units 110, 111, 112, and 113.

Through the recording medium transportation unit 107 having the above-described configuration, the recording medium 109 is transported between the recording and reproducing units 110, 111, 112, and 113 in accordance with an instruction from the CPU 102 of the data library apparatus 101.

An example where the recording medium transportation unit 107 is provided singly in the data library apparatus 101 is here illustrated, and further the recording medium transportation unit 107 may be provided in plurality therein. Further, a shape of the recording medium transportation unit 107 is not limited to the example of FIG. 4. For example, the recording medium transportation unit 107 may fix the recording medium for transportation by using a central hole of the recording medium.

Figure 5:
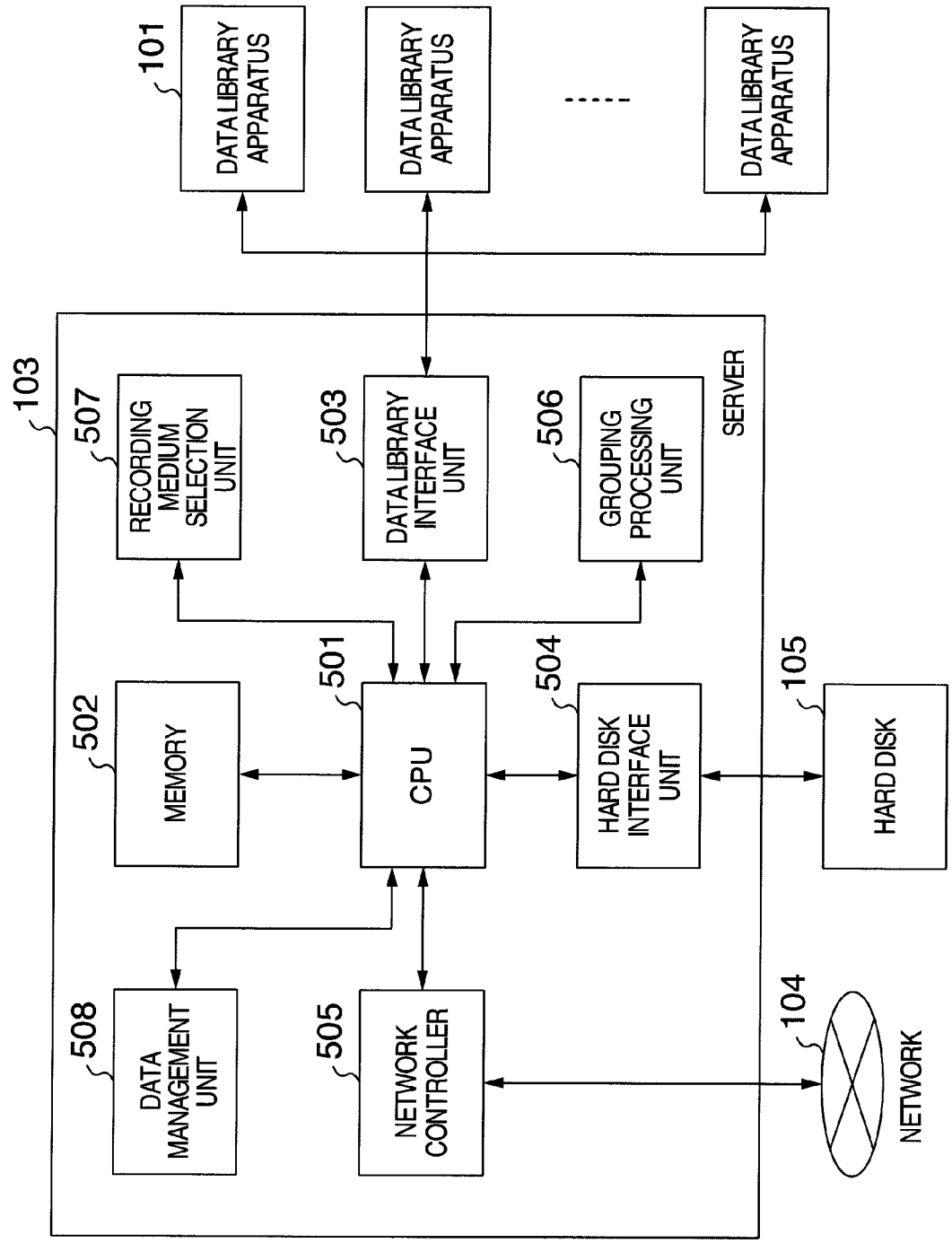
FIG. 5 is a block diagram illustrating a configuration of a recording and reproducing system.

FIG. 5 is a block diagram illustrating a configuration of a recording and reproducing system.

In the recording and reproducing system, one or more data library apparatus 101, a hard disk 105, and a network 104 are connected to the server 103.

The server 103 provides for the data library apparatus 101 a service centering on recording and reproduction of data. At the same time, the server 103 records and reproduces data on and from the hard disk 105 and transmits, receives, and manages data through the network 104.

A reference numeral 501 denotes a CPU of the server 103. At the time of recording data, the CPU 501 records data received from the network 104 via a network controller 505 on the hard disk 105 via a hard disk interface unit 504. Alternatively, the CPU 501 controls the data library apparatus 101 via a data library interface unit 503 and records the data on the recording medium determined by a recording medium selection unit 507.

At the time of reproducing data, the CPU 501 reads out the data from the hard disk 105 via the hard disk interface unit 504 and transmits the read-out data to the network 104 via the network controller 505. Or, alternatively, the CPU 501 controls the data library apparatus 101 via the data library interface unit 503, and reproduces data from the recording medium built in the data library apparatus 101. The CPU 501 further receives the reproduced data, and transmits the received data to the network 104 via the network controller 505.

A reference numeral 502 denotes a memory, and the memory 502 stores a program and a variety of information for controlling the CPU 501 of the server 103.

The data library interface circuit 503 performs control about transmission and reception of data between the data library apparatus 101 and the CPU 501 of the server 103.

In FIG. 5, a plurality of the data library apparatus are connected to one data library interface unit and further, for example, a plurality of the data library apparatus may be connected thereto via the network.

The hard disk interface unit 504 transfers data to and from the hard disk 105 in accordance with specifications such as SATA.

The network controller 505 performs control about transmission and reception of data between the network 104 and the CPU 501 of the server 103.

A reference numeral 506 denotes a grouping processing unit. By using related data, the grouping processing unit 506 groups data received from the network 104 via the network controller 505, data recorded on the hard disk 105, and data recorded on the recording medium 109, and gives the same group ID to them. The related data in the present embodiment is data having a high possibility that reproduction is performed simultaneously or continuously. Examples of the data belonging to the same group include files stored in the same folder, data backed up on the same day, image data in which the same human being is recorded, and data in which one file is divided in plurality.

Based on results in the grouping processing unit 506 and information about a data management unit 508, the recording medium selection unit 507 determines as to which recording medium data is recorded on.

In the present embodiment, the server 103 has the grouping processing unit 506 and the recording medium selection unit 507. The present invention is not limited to the above configuration, and further the data library apparatus 101 may have the grouping processing unit 506 and the recording medium selection unit 507.

The recording medium selection unit 507 of the present embodiment does not select the recording medium and recording surface on which the data of the same group as that of data to be recorded is recorded on a reverse surface. When the data of the same group is recorded on front and rear surfaces of the same recording medium, the recording medium selection unit 507 needs to take out the recording medium from the recording and reproducing unit once to reverse a direction of the surface, and load it in the recording and reproducing unit, and as a result, it takes time for processing. Suppose that when the data of the same group is recorded on another recording medium, reproduction of certain data is required. In this case, a recording medium on which data of the same group as that of the data is previously recorded is loaded in the recording and reproducing unit, thereby efficiently performing a reproducing process of the related data.

The data management unit 508 manages groups of the data determined by the grouping processing unit 506 and recording medium selection unit 507 and information about the recording medium on which the data is recorded.

FIG. 6 illustrates one example of a recording medium management table managed by the data management unit 508. For example, a recording medium ID, a recording surface, a group ID of recorded data, and a free area are associated, thereby configuring the recording medium management table. The recording medium ID and recording surface are information for identifying the recording medium and recording surface. The group ID of recorded data is a group ID of the data already recorded on the recording medium and recording surface indicated by the recording medium ID. The free area indicates a recordable data size in the recording medium and recording surface indicated by the recording medium ID. The recording medium management table is used at the time of checking a group ID of the data recorded on the recording medium, or searching a recording medium on which data of the same group as that of data to be reproduced is recorded.

The group ID may be recorded on the recording medium as an extension attribute of a file. Also, the recording medium ID and the group ID of recorded data may be recorded on the recording medium. In a UDF (Universal Disk Format), for example, an area for recording individual information of the recording medium is provided and recording is performed on the area. The above process permits data of the recording medium management table to be restored and reliability of the system to be improved. Also, when the recording medium is loaded in another data library apparatus, the recording medium management table is configured.

FIG. 7 illustrates one example of a data management table managed by the data management unit 508. For example, a data ID, a group ID, a size, a recording medium ID, and a recording surface are associated, thereby configuring the data management table. The data ID is information for identifying data recorded on the data library apparatus and hard disk. The group ID is information for identifying a group of data indicated by the data ID. The size is size information about the data. The recording medium ID and recording surface are information for identifying the recording medium and recording surface on which data is recorded. The data management table is used at the time of checking a group ID of data to be recorded, or searching a recording medium on which data to be reproduced is recorded.

Figure 8:
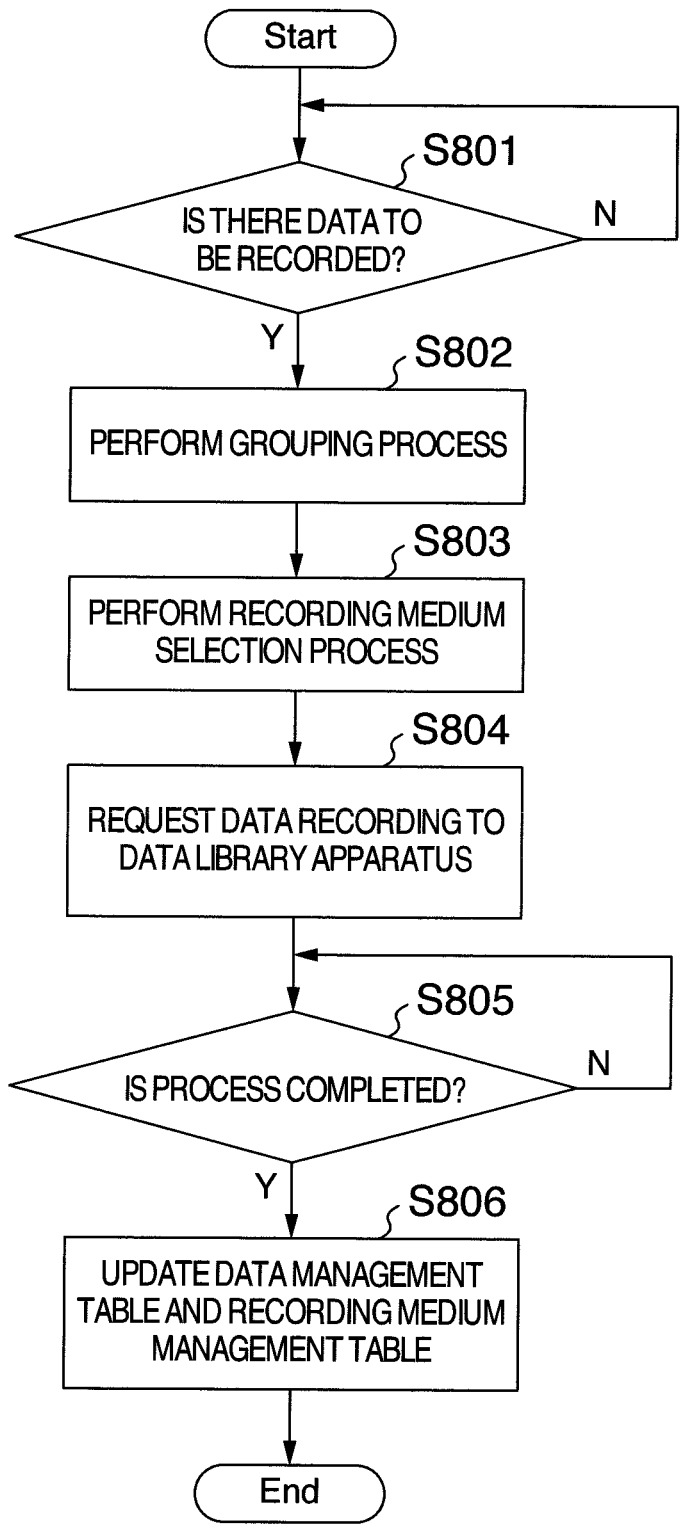
FIG. 8 is a flowchart illustrating a recording motion onto a recording medium in a recording and reproducing system.

FIG. 8 is a flowchart illustrating a recording operation on the recording medium of the recording and reproducing system.

At step S801, the CPU 501 of the server 103 checks whether there is data to be recorded on the recording medium from among data recorded on the hard disk 105.

The data to be recorded on the recording medium is, in other words, data to be moved from the hard disk 105 to the recording medium, or trouble-free data even if it is moved.

A determination as to which data ought to be recorded on the recording medium is performed by a program recorded on the memory 502 of the server 103. The determination as to which data ought to be recorded on the recording medium is similarly performed by a determination algorithm recorded on the memory 502. At the time of the determination, a standard of data in which a reproducing request is not made for a certain period or more may be used.

Next, at step S802, the CPU 501 determines as to which group the data recorded by the grouping processing unit 506 belongs to, and gives a group ID to the data.

Next, at step S803, the CPU 501 determines as to which recording medium and recording surface the recording medium selection unit 507 records data on. Details of the recording medium selection process will be described later.

Next, at step S804, the CPU 501 transfers recorded data and requests data recording to the data library apparatus 101 in which the recording medium determined at step S803 is stored.

Next, at step S805, the CPU 501 determines whether the process is completed.

Next, at step S806, the data management unit 508 updates information about the data management table and recording medium management table.

In the present embodiment, data to be recorded on the recording medium is selected from among the data recorded on the hard disk 105. Data received from the network 104 via the network controller 505 may be further recorded on the recording medium. In the present embodiment, a grouping process is performed after recording on the recording medium is determined. The grouping process may be further performed when data is received from the network 104 via the network controller 505 or data is recorded on the hard disk 105. In addition, the grouping process may be performed to the data already recorded on the recording medium.

Figure 9:
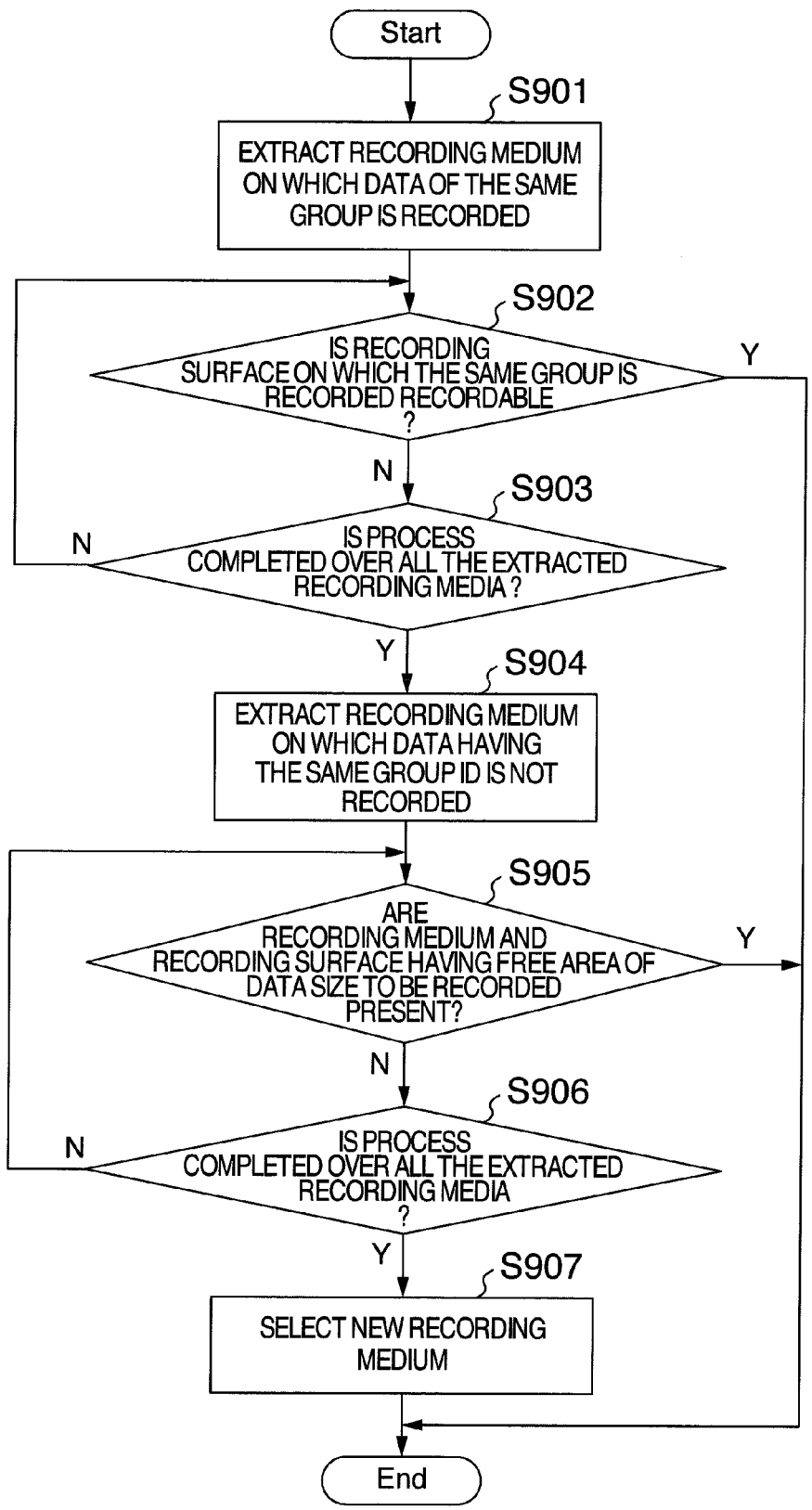
FIG. 9 is a flowchart illustrating a recording medium selection process in a recording and reproducing system.

FIG. 9 is a flowchart illustrating the recording medium selection process in the recording and reproducing system.

At step S901, by using the recording medium management table, there is extracted the recording medium on which data with the same group ID as that of data to be recorded is recorded.

At step S902, based on the free area, there is determined whether the recording surface on which the same group as that of data to be recorded is recorded is recordable in the recording media extracted at step S901. If the recording surface is recordable, the recording medium and recording surface are selected and the process is ended.

At step S903, there is confirmed whether the process of step S902 is completed over all of the recording media extracted at step S901.

At step S904, by using the recording medium management table, there is extracted a recording medium on which data with the same group ID as that of data to be recorded is not recorded.

At step S905, when a recording medium and a recording surface having a free area of data size or more to be recorded are present in the recording media extracted at step S904, the recording medium and recording surface are selected, and the process is ended.

At step S906, there is confirmed whether the process is completed over all of the recording media extracted at step S904.

When the recording medium of data to be recorded is not selected from among the recording media extracted at steps S901 and S904, a new recording medium is selected and the process is ended at step S907.

As an example, descriptions will be made about the recording medium selection process in the recording and reproducing system on which data is recorded as in the recording medium management table of FIG. 6 and the data management table of FIG. 7.

In FIG. 7, the recording medium selection process in which the data ID is data 5 will be first described. It is seen from the data management table that the group ID of the data 5 is A, and from the recording medium management table that the recording media on which the data the group ID of which is A is recorded are a front surface of the disk 1 and a rear surface of the disk 3. Of the two surfaces, only the rear surface of the disk 3 has a free area capable of recording the data 5, and therefore is selected as the recording medium and recording surface.

In FIG. 7, the recording medium selection process in which the data ID is data 6 will be then described. It is seen from the data management table that the group ID of the data 6 is B, and from the recording medium management table that the recording media on which the data the group ID of which is B is recorded are front surfaces of the disks 1 and 2. However, since both the surfaces are short of a free area, data cannot be recorded thereon. In rear surfaces of the disks 1 and 2, data is unrecorded and the free area is sufficient. However, in a reverse surface, since data the group ID of which is B is recorded, data cannot be recorded thereon. Next, check the disk 3 on which the data the group ID of which is B is not recorded. Since a front surface of the disk 3 has no free area, data cannot be recorded thereon. The rear surface of the disk 3 has a sufficient free area, and therefore is selected as the recording medium. Note that if the rear surface of the disk 3 also has no free area, a new recording medium is selected.

In the present embodiment, when a recording surface has a free area capable of recording data, it is selected as the recording medium. In other items, priority for selecting the recording medium may be further determined. For example, when large amounts of data the group ID of which is A is recorded on an HDD, data 6 is more preferably recorded on a new recording medium than on the rear surface of the disk 3. The reason is that the data the group ID of which is A is capable of being collectively recorded on the same recording medium and recording surface.

FIG. 10 is a flowchart illustrating the recording medium reproducing process in the recording and reproducing system.

At step S1001, by using the data management table, there are searched the recording medium and recording surface on which data to be reproduced is recorded. By using the recording medium management table, there are further searched the recording medium and recording surface on which data of the same group as that of the data to be reproduced is recorded.

At step S1002, there is loaded the recording medium on which the data to be reproduced and data of the same group as that of the data to be reproduced are recorded on the recording and reproducing unit in a direction in which data is reproduced from a surface on which the data to be reproduced and data of the same group as that of the data to be reproduced are recorded. At this time, when the number of the recording media on which the data of the same group is recorded is more than the number of the recording and reproducing units, the recording medium having high priority is loaded therein. As an example of how to determine the priority, for example, the priority of the recording medium on which the data of the same group is more recorded is made high. The recording medium on which the data of the same group is recorded is previously loaded in the recording and reproducing unit. Through the process, the recording and reproducing system efficiently performs the reproducing process of data having a high possibility that reproduction is performed simultaneously or continuously.

At step S1003, data reproduction is requested from the data library apparatus 101 which stores the recording medium specified at step S1001. The reproduced data is transmitted as needed from the data library apparatus 101 to the CPU 501 of the server 103 via the data library interface unit 503. The data is further transmitted to the network 104 via the network controller 505.

Next, at step S1004, when the process is completed, the process is ended.

At step S1002, not only the recording medium of the same group is loaded in the recording and reproducing unit, but also data may be read in the hard disk. When data is previously read in the hard disk, the recording and reproducing system fast corresponds to a reproduction request of the data.

When reproduction is requested, the reproducing process as in FIG. 10 may be performed, or need not be performed every time. For example, after the reproduction about data of a certain group is requested, or when the reproduction is requested to data of the same group as the group within a predetermined period, the reproducing process as in FIG. 10 may be performed. Through the above process, power saving and speeding up of the reproducing process are realized.

In the present embodiment, to one data, only one group ID is given, and further a plurality of group IDs may be given. For example, grouping of data belonging to the same folder and grouping of data which is backed up on the same day may be performed at the same time. In that case, a plurality of the group IDs may be given to one data. On this occasion, the priority of the group ID may be determined according to a purpose of reproduction. For example, when the purpose of reproduction is to browse files, there is a high possibility that the data belonging to the same folder is continuously reproduced. On the other hand, when the purpose of reproduction is to restore backup data, there is a high possibility that the data backed up on the same day is continuously reproduced.

Through the above configuration, even if related data is recorded across a plurality of recording media, the recording and reproducing system of the present embodiment efficiently performs a reproducing process of the related data.

Further, since recording positions of related data are managed, the recording and reproducing system easily searches for data required at the time of reproduction.

Further, when data related to data to be reproduced at the time of the reproduction is previously read in a hard disk, the recording and reproducing system fast performs a reproducing process of the related data.

In addition, the present invention is not limited to the above-described embodiments, but includes various modifications. For example, the above-described embodiments are described in detail in order to clearly describe the present invention, and are not necessarily limited to the data library apparatus having all the described constructions. Further, a part of configurations according to one embodiment can be replaced by those according to other embodiments, and the configurations according to other embodiments can be added to that according to one embodiment. Further, an addition, deletion, or replacement of the configurations according to other embodiments can be performed by using a part of the configurations according to each embodiment.

A part or all of the respective structures, functions, processing units, and processing approaches may be realized by hardware by designing through the integrated circuit, for example. Those structures, functions and the like may be realized by software by interpreting and executing the program for realizing the respective functions through a processor. Information with respect to the program, table, and file for realizing the respective functions may be stored in the recording unit such as the memory, hard disk, and SSD (Solid State Drive), or the recording medium such as the IC card, SD card, and DVD.

The examples show the control line and information line considered as necessary for the explanation, which does not necessarily show all the control lines and information lines of the product. Actually, almost all the components may be considered to be connected with one another.

The invention claimed is:

1. A recording and reproducing system comprising:
   a server; and
   a data library apparatus,
   wherein:
   the data library apparatus including:
   a recording medium storage unit which stores one or a plurality of first recording media having recording surfaces at both of front and rear surfaces;
   a recording and reproducing unit which records and reproduces data on and from the recording medium; and
   a recording medium transportation unit which transports and transfers the recording medium between the recording medium storage unit and the recording and reproducing unit,
   the server including:
   a second recording medium on which data is recorded;
   a data library interface unit which transmits and receives data to and from the data library apparatus;
   a grouping processing unit which groups data stored in the second recording medium based on related data;
   a recording medium selection unit which selects the first recording medium on which data is recorded at the time of recording data on the data library apparatus; and
   a data management unit which manages group information about data processed by the grouping processing unit and information about the recording medium selected by the recording medium selection unit, and
   at the time of recording data on the data library apparatus, the recording medium selection unit selects the first recording medium and recording surface with available capacity and on which data brought into the same group by the grouping processing unit is previously recorded and on which data brought into the same group by the grouping processing unit is not recorded on a reverse surface.

2. The recording and reproducing system according to claim 1, further comprising a plurality of the recording and reproducing units,
   wherein in the case where a reproduction request of data is performed, the recording medium selection unit selects a reproducible recording medium at the same time when loading in the plurality of recording and reproducing units the first recording medium on which data of the same group as that of the data in which the reproduction request is performed is recorded.

3. The recording and reproducing system according to claim 2, wherein when a reproduction request is performed in the data recorded on the first recording medium, included is a controller which controls the recording medium selection unit to specify a recording medium on which data of the same group as that of the data in which the reproduction request is performed is recorded, and load the specified recording medium in the recording and reproducing unit.

4. The recording and reproducing system according to claim 3, wherein when the number of recording media on which data of the same group as that of the data in which the reproduction request is performed is recorded is more than the number of the recording and reproducing units, included is a controller which controls the recording medium selection unit to load a recording medium having high priority in the recording and reproducing unit.

5. A server to be connected to a data library apparatus, comprising:
   a second recording medium on which data is recorded;
   a data library interface unit which transmits and receives data to and from the data library apparatus;
   a grouping processing unit which groups data stored in the second recording medium based on related data;
   a recording medium selection unit which selects the first recording medium on which data is recorded at the time of recording data on the data library apparatus; and
   a data management unit which manages group information about data processed by the grouping processing unit and information about the recording medium selected by the recording medium selection unit, wherein:
   the data library apparatus including:
   a recording medium storage unit which stores one or a plurality of first recording media having recording surfaces at both of front and rear surfaces;
   a recording and reproducing unit which records and reproduces data on and from the recording medium; and
   a recording medium transportation unit which transports and transfers the recording medium between the recording medium storage unit and the recording and reproducing unit, and
   at the time of recording data on the data library apparatus, the recording medium selection unit selects the first recording medium and recording surface with available capacity and on which data brought into the same group by the grouping processing unit is previously recorded and on which data brought into the same group by the grouping processing unit is not recorded on a reverse surface.

6. The server according to claim 5, wherein: the data library apparatus includes a plurality of the recording and reproducing units; and in the case where a reproduction request of data is performed, the recording medium selection unit selects a reproducible recording medium at the same time when loading in the plurality of recording and reproducing units the first recording medium on which data of the same group as that of the data in which the reproduction request is performed is recorded.

7. The server according to claim 6, wherein when a reproduction request is performed in the data recorded on the first recording medium, included is a controller which controls the recording medium selection unit to specify a recording medium on which data of the same group as that of the data in which the reproduction request is performed is recorded, and load the specified recording medium in the recording and reproducing unit.

8. The server according to claim 7 wherein
   when the number of recording media on which data of the same group as that of the data in which the reproduction request is performed is recorded is more than the number of the recording and reproducing units, included is a controller which controls the recording medium selection unit to load a recording medium having high priority in the recording and reproducing unit.

* * * * *